No. 810,648. PATENTED JAN. 23, 1906.
W. L. HAYNES.
SPACING MECHANISM.
APPLICATION FILED OCT. 26, 1904.
2 SHEETS—SHEET 2.
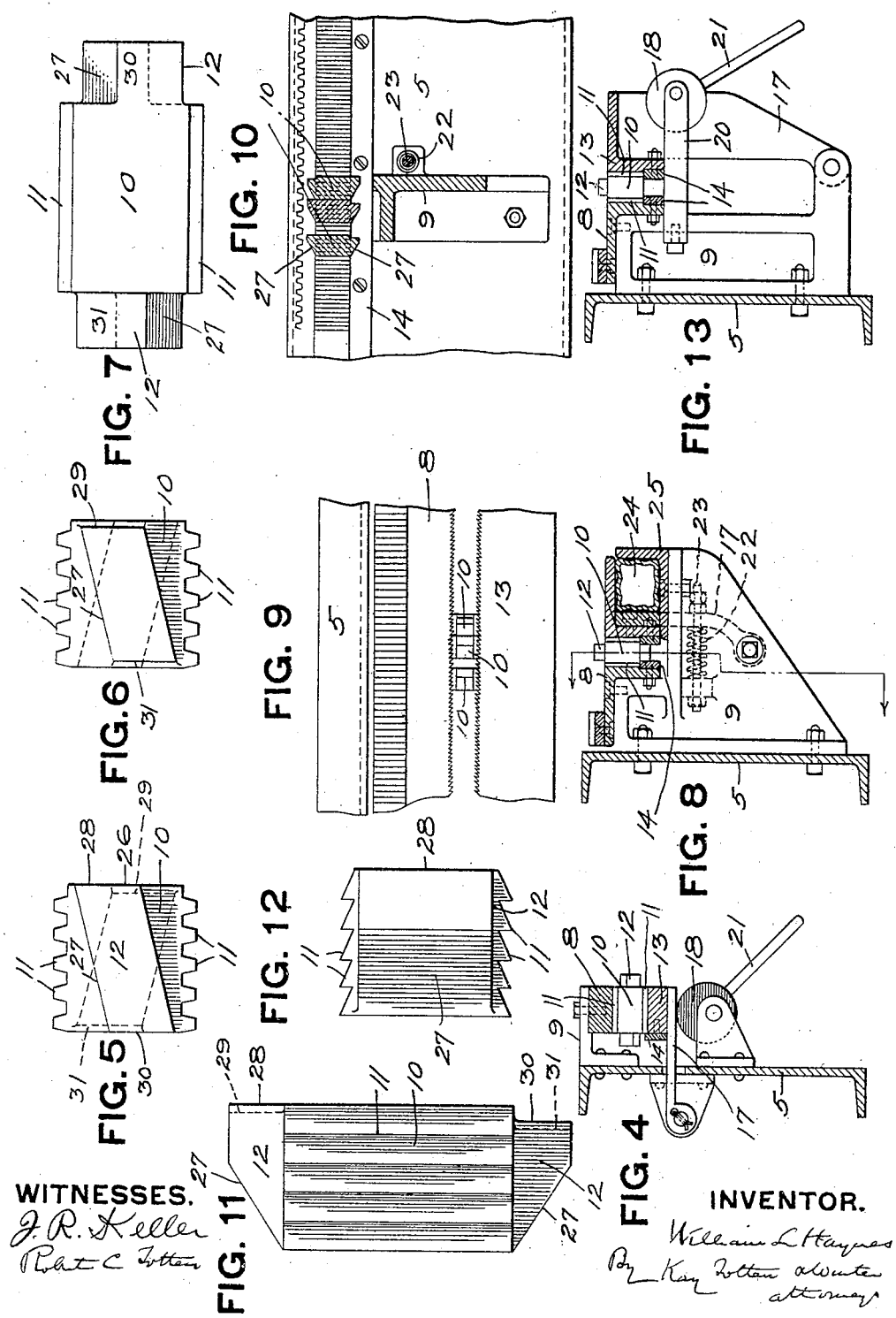
WITNESSES.
J. R. Keller
Robt C Totten
INVENTOR.
William L Haynes
By Kay Totten & Winter
attorneys

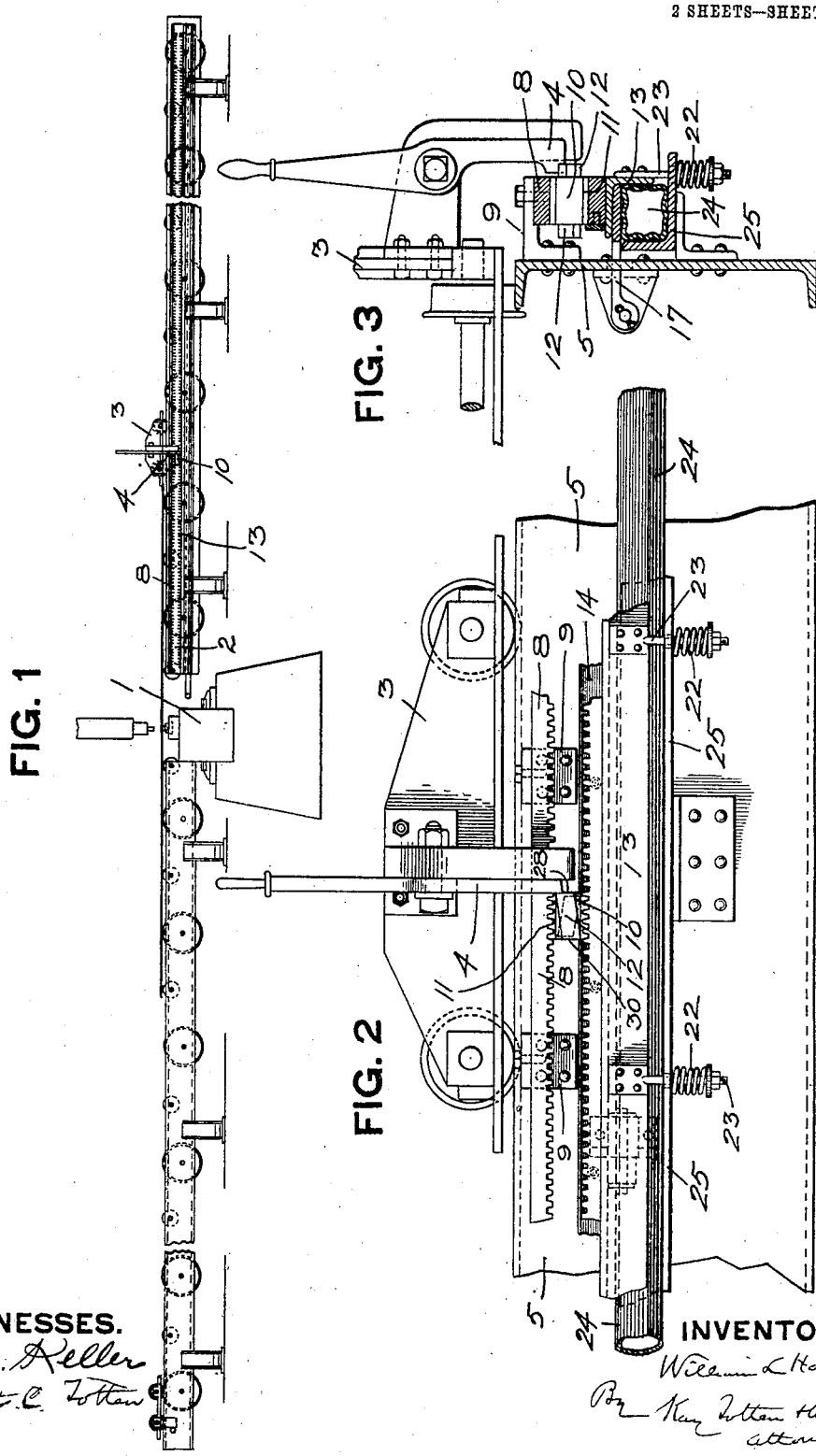

UNITED STATES PATENT OFFICE.

WILLIAM L. HAYNES, OF AMBRIDGE, PENNSYLVANIA.

SPACING MECHANISM.

No. 810,648. Specification of Letters Patent. Patented Jan. 23, 1906.

Application filed October 26, 1904. Serial No. 230,127.

*To all whom it may concern:*

Be it known that I, WILLIAM L. HAYNES, a resident of Ambridge, in the county of Beaver and State of Pennsylvania, have invented a new and useful Improvement in Spacing Mechanism; and I do hereby declare the following to be a full, clear, and exact description thereof.

My invention relates to spacing mechanism; and its object is to simplify the changeable stops and their holding means so that such stops can be more easily rearranged than prior devices of this character when changing from one class of work to another.

With many kinds of machines it is necessary to provide stop mechanism for properly positioning the work with reference to the working part of the machine. Instances of this kind are found in punching-machines, cutting-off machines, various woodworking-machines, engraving-machines, and the like. I will explain my invention in connection with a punching-machine, although the use is not limited thereto.

Machines designed for punching holes in long plates, beams, girders, bars, or the like are usually provided with a movable carriage which pushes or pulls or carries the work past the punching-tools. Such carriages also act as stops to position the work with reference to the punching-tools, so that the holes will be spaced the proper distances apart. It is the custom to provide along the ways on which the carriage travels suitable changeable stops against which a projection on the carriage will abut, so as to stop the carriage and position the work for punching. After being punched the stop on the carriage is disengaged from the stationary stop and the carriage moved on until its stop comes in contact with the next adjacent stationary stop, when the foregoing operation is repeated. Heretofore the stationary stops have comprised dogs held between nuts adjustable on a stationary screw or stops clamped by set-screws to a bar located along the ways on which the carriage travels. The adjustment of these dogs and stops to proper position requires considerable time and great care, and as this adjustment is necessary whenever changing from one class of work to another it has limited somewhat the output of the punching-machine. Analogous spacing mechanisms are also used, or at least may be used, in connection with a large variety of machines, such as shearing or other cutting-off machines, engraving-machines, milling-machines, woodworking-machines, paper punching and cutting machines, and many others. My invention is applicable to all such machines; and its object is to provide spacing mechanism in which the changeable stationary stops and their holding means are so arranged that the stops can be quickly and conveniently changed and without the necessity of exercising such extreme care as heretofore necessary.

The invention consists, generally stated, in providing along the ways on which the carriage or other spacing stop member moves a rack-bar and in conjunction therewith a series of blocks or dogs provided with serrated faces for engaging the rack-bar and held in engagement with the rack-bar by simple means, so that the said dogs can be easily removed and their positions with reference to the rack-bar quickly changed.

In the accompanying drawings, Figure 1 is a diagrammatic side view showing my invention applied to a punching or other machine. Fig. 2 is a side view of a portion on an enlarged scale. Fig. 3 is a cross-section showing the general arrangement of the spacing-carriage, the rack-bar, and spacing-dogs. Fig. 4 is a similar view showing a modification. Figs. 5, 6, and 7 are end and side views of the spacing pieces or dogs. Fig. 8 is a cross-section similar to Fig. 3, showing still another modification. Fig. 9 is a plan view of same. Fig. 10 is a horizontal section of same. Figs. 11 and 12 are respectively side elevation and plan view of a dog used with this modification; and Fig. 13 is a view similar to Fig. 3, showing still another modification.

In the drawings the punching or other machine with reference to which the work is to be positioned is shown diagrammatically at 1. The work is supported upon a suitable table 2, located in proximity to the machine. Movable on or along this table will be the spacing-stop member, which is shown as a carriage 3, moving on suitable ways on the table 2 and provided with the retractable stop-lever 4. All of the parts so far described, however, have been selected for purposes of illustration merely, as they may be varied within wide limits. The spacing-stop member 3 need not necessarily be a carriage, but may be a mere block or bar slidable on the table and against which the end of the work abuts. In the specific arrangement shown in the drawings the table is built up of channel-beams 5, on which the carriage 3 travels, and in practice there will be provided on both sides thereof rack-bars, with which mesh gears mounted on the carriage in order to propel said carriage back and forth and to hold the carriage squarely across the table. This arrangement, however, is old with feeding mechanism for punching-machines and forms no part of my invention. Along one or both sides of the carriage is arranged the stop mechanism which comprises my invention. This stop mechanism comprises a suitable rack-bar 8, extending parallel with the table and secured to suitable brackets 9, fastened to the sides of the table. This rack-bar is placed with the teeth either horizontal, as in Figs. 1 to 4, or with the teeth vertical, as in Figs. 8 to 13. In the former the rack-bar is a plain rectangular bar, while in Figs. 8 to 13 the teeth are formed on the vertical leg of an angle-bar bolted to the brackets 9. Obviously this may be varied within wide limits. The teeth of this rack-bar may be of various forms, either ordinary rack-teeth, as shown in Fig. 2, or of the form shown in Figs. 9 and 12—that is, having one side face sloping and the other square, so as to more efficiently take the thrust to which the spacing-stop member 3 is subjected. Coöperating with this spacing-bar are the spacing pieces or dogs 10, which on one side face at least will be provided with teeth 11 corresponding with the teeth on the rack-bar 8 and having projecting end portions 12, which form the stops against which the retractable lever or other stop 4 on the spacing-stop member 3 will contact. The form of teeth is not essential, as it is sufficient if the spacing-dogs and the coöperating rack-bar are provided with suitable interlocking projections and depressions of any kind or form. They might even be provided the one with a series of openings or holes and the other with bosses or projections for engaging said holes. The rack-bar construction, however, is preferred because it can be more easily and accurately made. Suitable means will be provided for holding the dogs in engagement with the rack-bar. To this end I provide a backing or clamping bar 13, extending parallel with the rack-bar 8, so that the dogs can be inserted between the two. Preferably this backing-bar also will be provided with rack-teeth, corresponding with the teeth on the bar 8, and both side faces on the dogs will be provided with teeth, thus holding the dogs on both sides thereof. When the dogs are placed vertically, as in Figs. 8 to 13, they will be prevented from falling down between the rack-bars by means of suitable strips 14, secured to the lower edges of the rack-bars. In this modification the bars 8 and 13 will preferably be provided with a rabbet or rebate at their lower edges, into which the bars 14 are secured. This is also done for the purpose of permitting the rack-teeth to be cut clear across the projecting portion of the faces of the angle-bars. Preferably a stop-face will be provided on both ends of the dogs for reasons hereinafter explained, and therefore the end portions of said dogs may be narrowed slightly, as shown in Fig. 12, in order that the body thereof will rest on the upper edges of the holding-strips 14.

The backing-bar 13 may, if desired, be held stationary with reference to the bar 8, such as connecting the same thereto or to the frame by suitable means. Preferably, however, the backing-bar 13 will be movable toward and from the bar 8, so that the dogs can be clamped tightly between the two bars. This clamping may be effected in a large variety of ways. In the drawings I have shown the bar 13 secured to the outer ends of arms 17, pivoted to the frame 5 or to the brackets 9, thus permitting the bar 13 to move toward and from the bar 8. This movement may be obtained in a variety of ways. For instance, in Fig. 4 is shown a cam or eccentric 18, rotatably mounted in suitable bearings and contacting with the bar 13. In Fig. 13 is shown a suitable yoke 20, in which the cam or eccentric 18 is mounted, said cam bearing against the arms 17. In both forms a lever 21 is provided for rotating the eccentric or cam, and thereby clamping the bar 13 against the dogs 10. Only a very slight movement is necessary, not more than one-sixteenth or one-eighth of an inch, and consequently the eccentricity of the cam 18 can be very slight. For effecting this clamping movement I prefer some means that works practically instantaneously. Accordingly in Figs. 3 and 8 I have shown a spring 22, surrounding a bolt 23, which is either secured to the bar 13, or else the spring presses against the arm 17 and serves to separate the rack-bars. Suitable fluid-pressure means is used for forcing the bar 13 inwardly against the dogs. This fluid-pressure means is shown as a suitable expansible pipe, hose, or other chamber 24, interposed between the bar 13 and a stationary abutment 25. It is obvious that when compressed air, gas, steam, water, or the like is admitted to the hose or chamber 24 the latter will be expanded, and thus force the bar 13 inwardly to clamp the dogs in place. Various other means for this purpose may be employed. If desired, the spring may be used to move the clamping-bar toward the rack-bar and the fluid-pressure means to separate said bars. The rack-teeth on the bars and dogs will be cut to some unitary standard—say one fourth of an inch in width. The dogs themselves will preferably be of a width approximately equal to the smallest pitch distance of the work to be laid out. Each dog will be provided on its front side with the stop-face 26 for engaging the stop-lever 4 of the carriage 3 and the upper face thereof will be beveled or cleared away to the rear, as at 27, so that the next dog can be placed tight up against the first dog and its front face be enabled to contact with the retractable stop 4 on the carriage. By making the dogs of a width equal to the smallest distance between the pitch-centers of the holes or other work to be formed on the bars or plates and by beveling or clearing away the upper faces of said dogs they can be placed tight up against each other and in that way provide for the minimum spacing of the work. Inasmuch as the pitch-centers of the work may be varied, I provide dogs having their stop-faces 26 laid out on fractions of the units according to which the rack-teeth themselves are designed. For instance, if the rack-teeth are designed on the unit of a quarter of an inch one dog will be provided with a front stop-face which is exactly at the zero-point of the unit, as shown at 28, Figs. 5 and 11, and other dogs will be provided with stop-faces slightly cleared away upon the fractions one-sixteenth, one-eighth, and three-sixteenths of inches, as shown, respectively, at 29, Figs. 5 and 11, and 30 and 31, Figs. 6 and 11. By having these four fractional stop-faces on the dogs I provide for spacing the centers of the work to one-sixteenth of an inch. Obviously, of course, any other unit or fraction might be employed.

To limit the number of different kinds of dogs, I prefer to form stop-faces on both ends thereof, as shown in Figs. 5, 6, 7, 11, and 12. With the form of dog shown in Figs. 5, 6, and 7 only a single form of dog is required to give the four fractional spacings above described. This dog is not only reversible end for end, but can also be placed with either side up, thus giving four different positions therefor. One side face of the dog—viz., the face 28—is located at one side of the space between the teeth, while the other face, such as 30, is located at the opposite side of the space between the teeth. If the face 28 is therefore on the zero of the units of the teeth, the face 30 will be one-eighth of an inch from said zero. Hence by merely turning the dog upside down two different spacings can be obtained. The faces 29 and 31 on the opposite end of the dog are each cleared away one-sixteenth of an inch, so that when the dog is turned end for end two additional spacings can be obtained.

The dog shown by Figs. 11 and 12 is reversible end for end, but is not reversible in any other position. Hence with this dog two different forms of dogs are necessary, one having the stop-faces 28 and 30 and the other the faces 29 and 31.

In the use of my mechanism the dogs 10 will be placed between the bars 8 and 13 to the required number and at the proper intervals to secure the desired design of work by the machine. They will then preferably be clamped tightly in place, so as to insure accuracy, and the spacing-stop member 3 will be moved along by hand or by any suitable power mechanism, and its stop 4 will be brought into contact with the front face of each one of the dogs held in the rack, thus positioning the spacing-stop member 3 at the proper intervals to secure the punching of the holes or other work at the proper places. As soon as the hole is punched or other work is performed the stop 4 will be lifted and the spacing member 3 moved along until the stop comes in contact with the next adjacent dog, when the operation on the work will be repeated and the spacing-stop member 3 again moved along, and so on until the entire length of the work has been subjected to the necessary operations and at the proper intervals. When changing from work of one class to that of another, it is merely necessary to release the clamping action of the bar 13 on the dogs 10, take the same out, and place them back in between the bars at the proper intervals apart. This can be very quickly performed and does not require any special attention to accuracy, it merely being necessary to note which of the fractional stop-faces is in position to be engaged by the stop member 4. These fractional stop-faces, together with the unitary spacing of the rack-teeth, insure the proper position of the stop-faces. Much less time is required for this than it is to adjust nuts, screws, and the like to the proper position.

As stated at the outset my invention is applicable to any form of machine employing spacing mechanism for the work. It is not intended to be limited by the specific description and disclosure in the drawings.

The carriage 3 obviously may be replaced by any suitable movable member which forms the stop or gage for positioning the work with reference to the machine or tools.

What I claim is—

1. In spacing mechanism, the combination of a stationary spacing-bar, a bar parallel to said spacing-bar, a spacing-stop member movable along said spacing-bar, and changeable stop-pieces adapted to be inserted between said bars and held with their ends projecting into position to be engaged by said stop member, said spacing-bar and stop-pieces being provided with equidistant coöperating depressions and projections, and said stop-pieces having a stop-face on each end arranged differently with reference to their projections.

2. In spacing mechanism, the combination of a stationary spacing-bar, a spacing-stop member movable along said bar, changeable stop-pieces adapted to be held by said bar in position to be engaged by said stop member, said bar and stop-pieces being provided with equidistant coöperating depressions and projections, and said stop-pieces having a stop-face on each end arranged differently with reference to their projections, and having both end faces cleared away back of said stop-faces.

3. In spacing mechanism, the combination of a stationary rack-bar, a bar parallel to said rack-bar, a spacing-stop member movable along said rack-bar, and changeable stop-pieces provided with teeth and adapted to be inserted between said bars and held by said rack with their ends projecting into position to be engaged by said stop member, said stop-pieces having a stop-face on each end arranged differently with reference to their teeth.

4. In spacing mechanism, the combination of a stationary rack-bar, a spacing-stop member movable along said bar, and changeable stop-pieces provided with teeth and arranged to be engaged by said rack and held in position to be engaged by said stop member, said stop-pieces having a stop-face on each end and having both ends cleared away behind said stop-faces.

5. In spacing mechanism, the combination of a stationary rack-bar, a bar parallel to said rack-bar, a spacing-stop member movable along said rack-bar, and changeable stop-pieces provided with teeth for engaging the rack and adapted to be inserted between said bars and held with their ends projecting into position to be engaged by said stop member, said stop-pieces having stop-faces on their ends, and one of said bars being provided with a ledge or flange against which the end of the stop-pieces abut.

6. In spacing mechanism, the combination of a stationary rack-bar, a spacing-stop member movable along said bar, changeable stop-pieces provided with teeth for engaging the rack and adapted to be held by the latter in position to be engaged by the stop member, said stop-pieces being provided with a stop-face at each end and having their ends cleared away back of said stop-faces, and means for holding said stop-pieces against said rack-bar.

7. In spacing mechanism, the combination of a stationary spacing-bar, a spacing-stop member movable along said bar, changeable stop-pieces adapted to be held by said bar in position to be engaged by said stop member, a bar parallel to the spacing-bar and arranged to hold the spacing-pieces against the spacing-bar, said spacing-bar and holding-bar being provided with teeth on their facing sides, and said stop-pieces being provided on their side faces with corresponding teeth.

8. In spacing mechanism, the combination of a stationary spacing-bar, a bar parallel to said spacing-bar, said spacing-bar being provided with teeth on its side which faces the other bar, a spacing-stop member movable along said bars, and changeable stop-pieces adapted to be inserted between said bars and provided on their side faces with teeth to engage the teeth on said spacing-bar.

9. In spacing mechanism, the combination of two parallel bars both provided with teeth on their facing sides, a spacing-stop member movable along said bars, and changeable stop-pieces provided with teeth on two of their sides and adapted to be inserted between said bars and held in position thereby to be engaged by said spacing member.

10. In spacing mechanism, the combination of a stationary spacing-bar, a spacing-stop member movable along said bar, changeable stop-pieces adapted to be held by said bar in position to be engaged by said stop member, a hinged clamping-bar parallel to the spacing-bar, and means for pressing the same against said spacing-pieces.

11. In spacing mechanism, the combination of a stationary spacing-bar, a spacing-stop member movable along said bar, changeable stop-pieces adapted to be held by said bar in position to be engaged by said stop member, a clamping-bar parallel to the spacing-bar and movable toward and from the same, and fluid-pressure means for moving the same.

12. In spacing mechanism, the combination of a stationary spacing-bar, a spacing-stop member movable along said bar, changeable stop-pieces adapted to be held by said bar in position to be engaged by said stop member, a clamping-bar parallel to the spacing-bar, a stationary abutment at the side of said clamping-bar, and an expansible fluid-pressure chamber between said clamping-bar and stationary abutment.

13. In spacing mechanism, the combination of a stationary spacing-bar, a spacing-stop member movable along said bar, changeable stop-pieces adapted to be held by said bar in position to be engaged by said stop member, a clamping-bar parallel to the spacing-bar and movable toward and from the same, a spring and fluid-pressure means, the one for moving said clamping-bar toward the spacing-bar, and the other for moving the same away from said spacing-bar.

14. In spacing mechanism, the combination of a stationary spacing-bar, a spacing-stop member movable along said bar, a clamping-bar parallel to the spacing-bar, said clamping and spacing bars being provided on their facing sides with teeth, changeable stop-pieces provided with teeth on opposite side faces for engaging the teeth in the clamping and spacing bars, and means for moving said clamping-bar to clamp said spacing-pieces against the spacing-bar.

15. In spacing mechanism, the combination of a stationary rack-bar, and a series of changeable stop-pieces having teeth on two of their sides for engaging said rack-bar and having stop-faces on opposite sides thereof, whereby said stop-pieces are reversible.

16. In spacing mechanism, the combination of a stationary rack-bar, and a series of changeable stop-pieces adapted to be held by said rack-bar, said stop-pieces having teeth on opposite side faces and with stop-faces on opposite edge faces and having a portion of each side face cleared away back of the two stop-faces.

17. In spacing mechanism, the combination of a stationary rack-bar, and a series of changeable stop-pieces adapted to be held by said rack-bar, said stop-pieces being provided with teeth on two opposite side faces and with stop-faces on the two opposite edge faces at both ends, whereby said stop-pieces are reversible end for end and side for side.

18. In spacing mechanism, the combination of a stationary rack-bar, and a series of changeable stop-pieces adapted to be held by said rack-bar, said stop-pieces being provided with teeth on the two opposite side faces and with stop-faces on the two opposite edge faces at both ends and having both side faces at both ends cleared away back of said stop-faces.

19. In spacing apparatus, a stationary bearing having vertical serrations therein, a movable bearing having vertical serrations therein, a stop having vertical serrations engaged by the serrations of said bearings, and means for clamping said parts together.

20. In spacing apparatus, a reversible stop having contact-surfaces on opposite ends thereof unequally distant from the plane parallel thereto and passing centrally through the body of said stop, a stationary bearing and a movable bearing for clamping said stop.

21. In spacing apparatus, a stop having parallel serrations on opposite sides thereof and opposite ends having contact-surfaces unequally distant from the axial plane of said stop.

22. In spacing apparatus, a series of adjustable stops, a bar for holding said stops, and mechanism for clamping several points of said bar by a single operation.

23. In spacing apparatus, a series of adjustable stops, a stationary bearing having serrations thereon, a movable bearing having serrations thereon, a plurality of stops having serrations engaged by the serrations of said bearings, and mechanism for clamping and unclamping said parts at several points by a single operation.

24. In spacing apparatus, a series of adjustable stops and mechanism for fastening or unfastening all of said stops by a single operation.

In testimony whereof I, the said WILLIAM L. HAYNES, have hereunto set my hand.

WILLIAM L. HAYNES.

Witnesses:
ROBERT C. TOTTEN,
G. KREMER.